United States Patent
Jian et al.

(10) Patent No.: US 8,644,558 B2
(45) Date of Patent: Feb. 4, 2014

(54) PASSENGER DETECTOR

(75) Inventors: Er-Liang Jian, Taoyuan County (TW); Chi-Liang Chien, Taoyuan County (TW); Min-Fang Lo, Taoyuan County (TW); Shih-Shinh Huang, Kaohsiung (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 55 days.

(21) Appl. No.: 13/313,199

(22) Filed: Dec. 7, 2011

(65) Prior Publication Data
US 2013/0148844 A1    Jun. 13, 2013

(51) Int. Cl.
    *G06K 9/00*    (2006.01)
(52) U.S. Cl.
    USPC .......................................................... 382/103

(58) Field of Classification Search
    None
    See application file for complete search history.

(56) References Cited

PUBLICATIONS

Farmer, Michael E., and Anil K. Jain. "Occupant classification system for automotive airbag suppression." Computer Vision and Pattern Recognition, 2003. Proceedings. 2003 IEEE Computer Society Conference on. vol. 1. IEEE, 2003.*

* cited by examiner

*Primary Examiner* — Stephen R Koziol
*Assistant Examiner* — Amandeep Saini
(74) *Attorney, Agent, or Firm* — Jackson IPG PLLC

(57) ABSTRACT

A passenger detector includes an image taker, an image processor and a storage unit. The image taker is used for taking an image of a passenger sitting on a seat. The image processor is connected to the image taker. The image processor is used to learn and identify features of the image and possibilities of states of the passenger and integrate the possibilities to select the most likely state of the passenger. The storage unit is connected to the image processor. The storage unit is used to store image data before and after taking the image.

2 Claims, 2 Drawing Sheets

PASSENGER DETECTOR

BACKGROUND OF INVENTION

1. Field of Invention

The present invention relates to a passenger detector and, more particularly, to an image detector for identifying the type of a passenger on a seat of a car.

2. Related Prior Art

Air bags have been proven to effectively protect passengers in car accidents. An air bag is inflated fast via ignition and explosion of explosive when a car is hit severely. The inflation is fast so that the air bag during the inflation might however harm an infant, a child or even an adult. Traditionally, the explosion of the explosive is constant regardless the state of a passenger so that the air bag might cause an injury to a passenger but provide insufficient protection to another passenger. Hence, there have been various attempts to provide detectors for detecting the state of a passenger so that the explosion can be executed to a degree according to the detected state of the passenger.

Conventional detectors are generally weight detectors used to measure the weight of the passenger so that the explosion of the explosive is executed according to the measured weight of the passenger. The measurement of the weight of the passenger by the weight detectors could be affected by the pose of the passenger or vibration during the travel of the car. On the other hand, the weight detectors are expensive and it is difficult to locate them in the cars.

There have been attempts to use image detectors to use computerized images of the passengers to determine the state of the passengers. Some of the image detectors are based on monocular vision while the others are based on stereo vision. Based on the monocular vision, a single camera is used to provide an edge image, a silhouette, or a differential image of a passenger that is not affected by light and shadow. Based on the stereo vision, two cameras are used, as imitation of human eyes, to take two images of the passenger to produce a disparity map.

An image detector, based on the monocular vision or the stereo vision, analyzes characters of a computerized image of a passenger to determine the state of the passenger. The analysis is conducted according to an algorithm such as nearest neighbor, k nearest neighbor, non-linear discriminate analysis and support vector machine. To overcome problems related to the angle and intensity of light and the look of the passenger, the image detectors are operated with an assumption that the camera(s) and a seat on which the passenger sits are not moved relative to each other. This assumption is however not practical since the camera(s) and the seat are moved relative to each other because of vibration during the travel of the car.

The present invention is therefore intended to obviate or at least alleviate the problems encountered in prior art.

SUMMARY OF INVENTION

It is the primary objective of the present invention to provide an accurate image detector.

To achieve the foregoing objective, the passenger detector includes an image taker, an image processor and a storage unit. The image taker is used for taking an image of a passenger sitting on a seat. The image processor is connected to the image taker. The image processor is used to learn and identify features of the image and possibilities of states of the passenger and integrate the possibilities to select the most likely state of the passenger. The storage unit is connected to the image processor. The storage unit is used to store image data before and after taking the image.

In an aspect, the image taker includes a camera.

In another aspect, the image processor includes a learning unit and an identifying unit.

In another aspect, the learning unit builds background models for various states of various seats, describes the features of the passenger as difference measure between the image and the background models, and learns passenger models by selecting common features corresponding to at least one type of passenger.

In another aspect, the identifying unit calculates the possibilities of the passenger models and introduces a characteristic spatial relationship between the passenger and the background to reduce influences by vibration of the seat.

In another aspect, the storage unit includes a flash memory.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
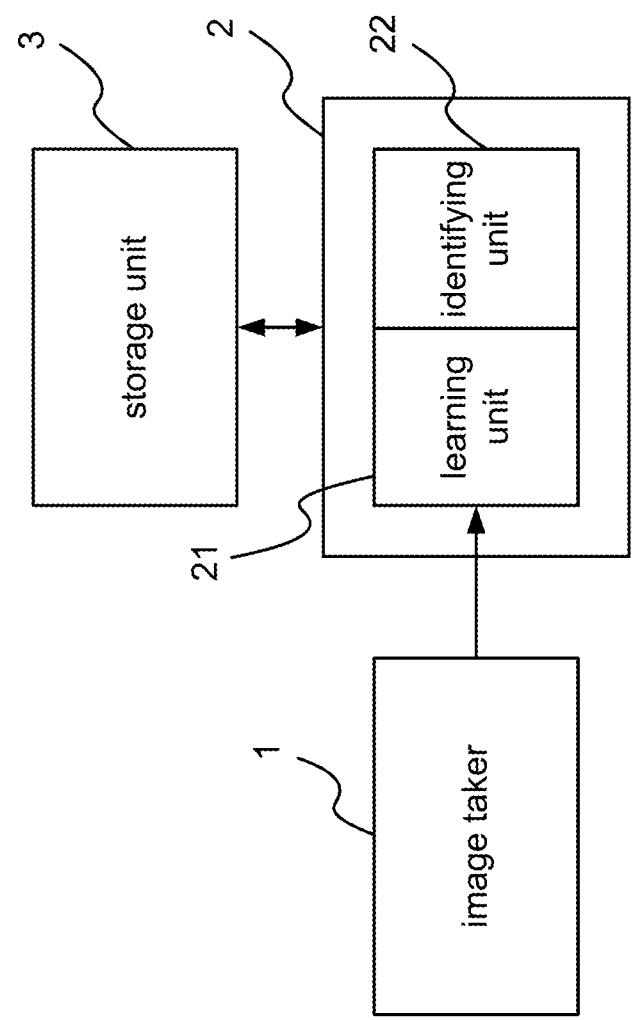
FIG. 1 is a block diagram of an image detector according to the preferred embodiment of the present invention.

Referring to FIG. 1, shown is a passenger detector for detecting the type of a passenger sitting in a seat of a car according to the preferred embodiment of the present invention. The passenger detector includes an image taker 1, an image processor 2 and a storage unit 3.

The image taker 1 is provided in front of the seat. The image taker 1 is used to take an image of the passenger sitting on the seat. The image taker 1 may include a camera.

The image processor 2 is electrically connected to the image taker 1. The image processor 2 is used to learn, identify and calculate features of the image and possibilities of states of the passenger corresponding to the features. The image processor 2 is further used to integrate the possibilities of the states of the passenger and select the most likely type of the passenger. Thus, the image processor 2 is used to identify the various states of the passenger correctly.

The image processor 2 includes a learning unit 21 and an identifying unit 22. The learning unit 21 builds models for various states of the empty seat. These models are referred to as the "background models." The features of the passenger are described by difference measure between the image and the background models. Passenger models are learned by selecting common features corresponding to one or more types of passengers.

The identifying unit 22 is used to calculate possibilities of the passenger models learned thereby. Moreover, the identifying unit 22 is used to introduce a characteristic spatial relationship between the passenger and the background to reduce affects by the vibration of the seat.

The storage unit 3 is electrically connected to the image processor 2. The storage unit 3 is used to store image data before and after taking the image. The storage unit 3 may include a flash memory.

Figure 2:
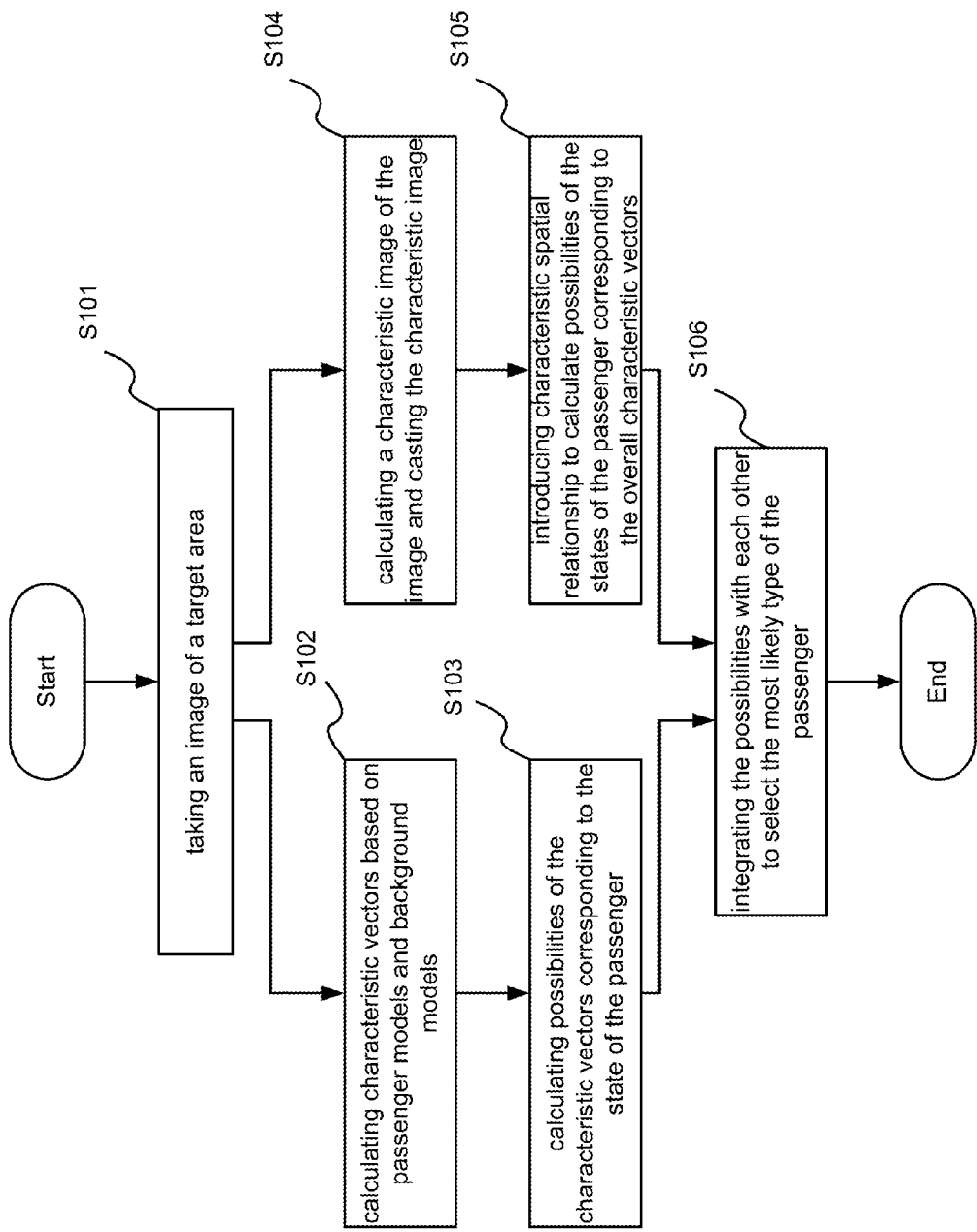
FIG. 2 is a flow chart of an algorithm used in the image detector shown in FIG. 1.

Referring to FIG. 2, at s101, the image taker 1 takes an image of a target area, i.e., the passenger sitting on the seat.

At s102, the image processor 2 calculates characteristic vectors based on the passenger models and background models learned thereby.

At s103, the image processor 2 calculates the possibilities of the characteristic vectors corresponding to the state of the passenger.

At s104, the image processor 2 calculates a characteristic image of the image and casts the characteristic image onto characteristic vectors with a smaller number of dimensions.

At s105, the image processor 2 introduces the characteristic of spatial relationship to calculate the possibilities of the states of the passenger corresponding to the characteristic vectors.

At s106, the image processor 2 integrates the possibilities with each other to select the most likely type of the passenger.

As discussed above, the type of the passenger is correctly identified. The common features of various states of various passengers and the characteristic of spatial relationship are used to identify the type of the passenger without being affected by light and vibration.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A passenger detector including:
    a camera arranged in front of a seat so as to obtain an image of a passenger sitting on the seat;
    an image processor connected to the camera and comprising:
        a learning unit configured to build background models for various states of various empty seats, describe features of the passenger as difference measures between the obtained image and the empty seat based background models, and learn passenger models via selecting common features related to at least one type of passenger and
        an identifying unit configured to calculate possibilities of the passenger models and introduce a characteristic spatial relationship between the passenger and the background models to reduce influences by vibration of the seat so as to learn and identify features of the image and possibilities of states of the passenger and integrate the possibilities to select the most likely state of the passenger; and
    memory connected to the image processor and configured to store image data.

2. The passenger detector according to claim 1, wherein the memory includes a flash memory.

* * * * *